United States Patent
Sumi

(10) Patent No.: US 12,068,111 B2
(45) Date of Patent: *Aug. 20, 2024

(54) METHOD OF MANUFACTURING ELECTRONIC COMPONENT

(71) Applicant: Murata Manufacturing Co., Ltd., Nagaokakyo (JP)

(72) Inventor: Akira Sumi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/988,886

(22) Filed: Nov. 17, 2022

(65) Prior Publication Data

US 2023/0079065 A1  Mar. 16, 2023

Related U.S. Application Data

(63) Continuation of application No. 16/864,187, filed on May 1, 2020, now Pat. No. 11,521,797.

(30) Foreign Application Priority Data

May 16, 2019 (JP) .................................. 2019-092776

(51) Int. Cl.
  *H01G 4/12* (2006.01)
  *H01G 4/232* (2006.01)
  *H01G 4/30* (2006.01)
  *H01G 13/00* (2013.01)

(52) U.S. Cl.
  CPC .............. *H01G 4/12* (2013.01); *H01G 4/232* (2013.01); *H01G 4/30* (2013.01); *H01G 13/006* (2013.01); *Y10T 29/435* (2015.01)

(58) Field of Classification Search
  CPC .. H01G 13/003; H01G 13/006; H01G 4/0085; H01G 4/12; H01G 4/1227
  See application file for complete search history.

(56) References Cited

U.S. PATENT DOCUMENTS

| | | | |
|---|---|---|---|
| 11,521,797 B2* | 12/2022 | Sumi | ........................ H01G 4/12 |
| 2023/0079065 A1* | 3/2023 | Sumi | ...................... H01G 4/224 29/25.42 |

OTHER PUBLICATIONS

Sumi, "Method of Manufacturing Electronic Component", U.S. Appl. No. 16/864,187, filed May 1, 2020.

* cited by examiner

*Primary Examiner* — Minh N Trinh
(74) *Attorney, Agent, or Firm* — Keating & Bennett, LLP

(57) ABSTRACT

A method of manufacturing an electronic component includes preparing an unfired multilayer body, bonding one of first and second side surfaces of each unfired multilayer body to an adhesive sheet such that the unfired multilayer bodies are in at least one row, polishing the other side surface of each unfired multilayer body by rotating a polishing surface of a rotary polishing machine in contact with the other side surface of each unfired multilayer body, and forming a first insulating layer on the polished other side surface, wherein in the polishing the other side surface, at least one of the rotary polishing machine and the adhesive sheet is moved relative to the other to form a polish groove in the length direction, and the rotary polishing machine has a cylindrical shape and includes an outer circumferential surface that defines the polishing surface.

15 Claims, 12 Drawing Sheets

METHOD OF MANUFACTURING ELECTRONIC COMPONENT

This application is a continuation of U.S. application Ser. No. 16/864,187, now U.S. Pat. No. 11,521,797. This application claims the benefit of priority to Japanese Patent Application No. 2019-092776 filed on May 16, 2019. The entire contents of these applications are hereby incorporated herein by reference.

BACKGROUND OF THE INVENTION

1. Field of the Invention

The present invention relates to a method of manufacturing an electronic component.

2. Description of the Related Art

Conventionally known is an electronic component formed by a plurality of dielectric layers and a plurality of internal electrodes that are alternately stacked on one another, such as a multilayer ceramic capacitor.

As one example of a method of manufacturing such an electronic component, Japanese Patent Laid-Open No. 09-153433 discloses a method of manufacturing an electronic component in the following manner. Specifically, an unfired multilayer body is first fabricated, which is to be formed as a multilayer body after firing that includes a plurality of dielectric layers and a plurality of internal electrodes alternately stacked on one another so as to have both side surfaces from which the internal electrodes are exposed. Then, an insulating layer is formed so as to cover the unfired internal electrodes exposed on both side surfaces of the unfired multilayer body, which is then subjected to firing. Then, an external electrode is formed on each of both end surfaces of the unfired multilayer body. Thereby, the electronic component is manufactured. An unfired multilayer body can be fabricated by cutting a stack of ceramic green sheets each having an internal electrode pattern printed thereon.

In this case, there are minutely small projections and recesses on each side surface of the unfired multilayer body obtained by cutting the stack of ceramic green sheets. Thus, if an insulating layer is formed in this state, a gap occurs between the insulating layer and the unfired multilayer body, so that the insulating layer of the electronic component is readily peeled off. Accordingly, it is preferable to reduce such minutely small projections and recesses by polishing each side surface of the unfired multilayer body.

However, it turned out that, depending on the polishing method, polishing sag may occur in the unfired internal electrode exposed on each side surface.

SUMMARY OF THE INVENTION

Preferred embodiments of the present invention provide methods of manufacturing an electronic component, by each of which the occurrence of polishing sag in an unfired internal electrode is able to be significantly reduced or prevented when a side surface of an unfired multilayer body is polished.

A method of manufacturing an electronic component according to a preferred embodiment of the present invention is to manufacture an electronic component including at least a multilayer body and an insulating layer that covers a side surface of the multilayer body. The multilayer body includes a plurality of dielectric layers and a plurality of internal electrodes that are alternately stacked on one another. The method includes preparing an unfired multilayer body that is to be formed as the multilayer body after firing, the unfired multilayer body including a first main surface and a second main surface that are opposite to each other in a stacking direction, a first side surface and a second side surface that are opposite to each other in a width direction orthogonal to the stacking direction, and a first end surface and a second end surface that are opposite to each other in a length direction orthogonal to the stacking direction and the width direction, bonding one side surface of the first side surface and the second side surface of each unfired multilayer body to an adhesive sheet such that a plurality of the unfired multilayer bodies are disposed on the adhesive sheet in at least one row, polishing the other side surface of the first side surface and the second side surface of each of the plurality of unfired multilayer bodies provided in the at least one row by rotating a polishing surface of the rotary polishing machine in a state where the polishing surface is in contact with the other side surface of each of the plurality of unfired multilayer bodies, and forming a first insulating layer on the polished other side surface, wherein in the polishing the other side surface, at least one of the rotary polishing machine and the adhesive sheet is moved relative to the other of the rotary polishing machine and the adhesive sheet to form a polish groove in the length direction, and the rotary polishing machine has a cylindrical shape and includes an outer circumferential surface that defines and functions as the polishing surface.

According to methods of manufacturing an electronic component according to preferred embodiments of the present invention, at least one of the rotary polishing machine and the adhesive sheet is moved relative to the other of the rotary polishing machine and the adhesive sheet to form a polish groove on the unfired multilayer body in its length direction. Thus, by aligning the extending direction of each unfired internal electrode exposed on the another side surface of the unfired multilayer body to extend in the same or substantially the same direction as the direction in which a polish groove is formed, the occurrence of polishing sag in each unfired internal electrode is able to be significantly reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be hereinafter described to specifically explain the features of the present invention. In the following, a multilayer ceramic capacitor will be described as an example of an electronic component to be manufactured. It should be noted that the electronic component only has to include at least a multilayer body including a plurality of dielectric layers and a plurality of internal electrodes that are alternately stacked on one another, and an insulating layer that covers the side surface of the multilayer body, but is not limited to such a multilayer ceramic capacitor.

Multilayer Ceramic Capacitor

Figure 1:
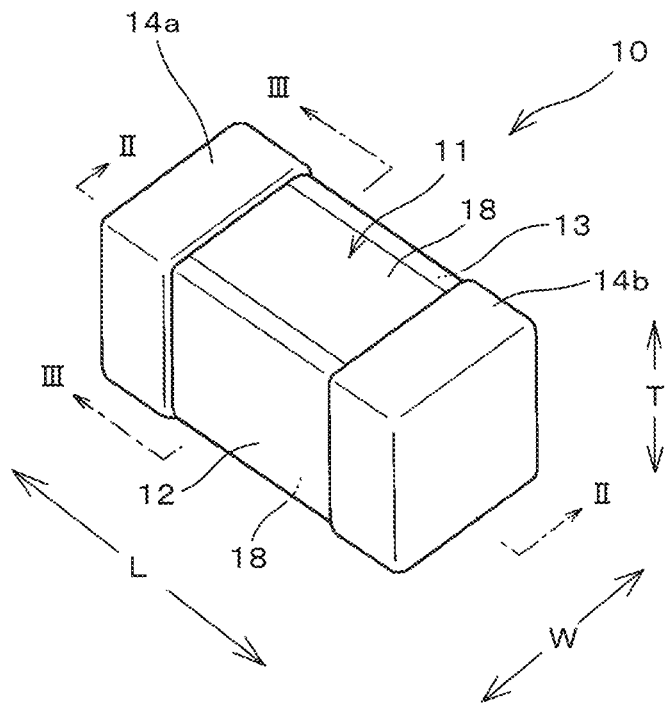
FIG. 1 is a perspective view showing a multilayer ceramic capacitor as an example of an electronic component.
Figure 2:
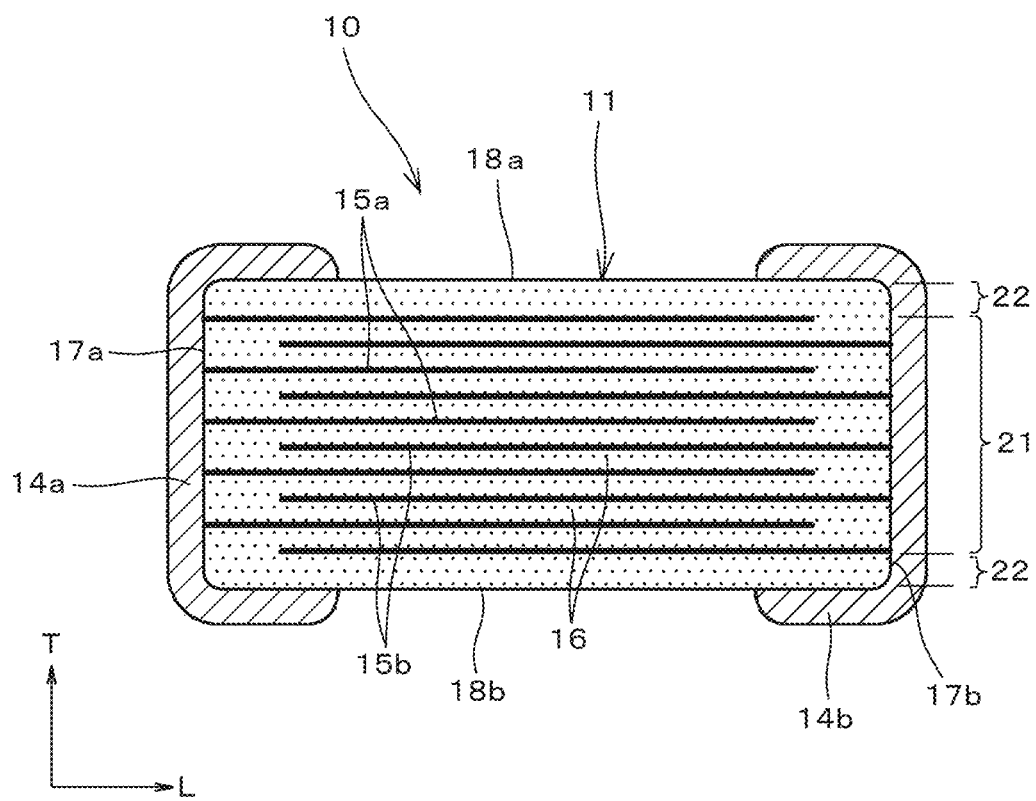
FIG. 2 is a view of the multilayer ceramic capacitor shown in FIG. 1 in a cross section taken along a line II-II.
Figure 3:
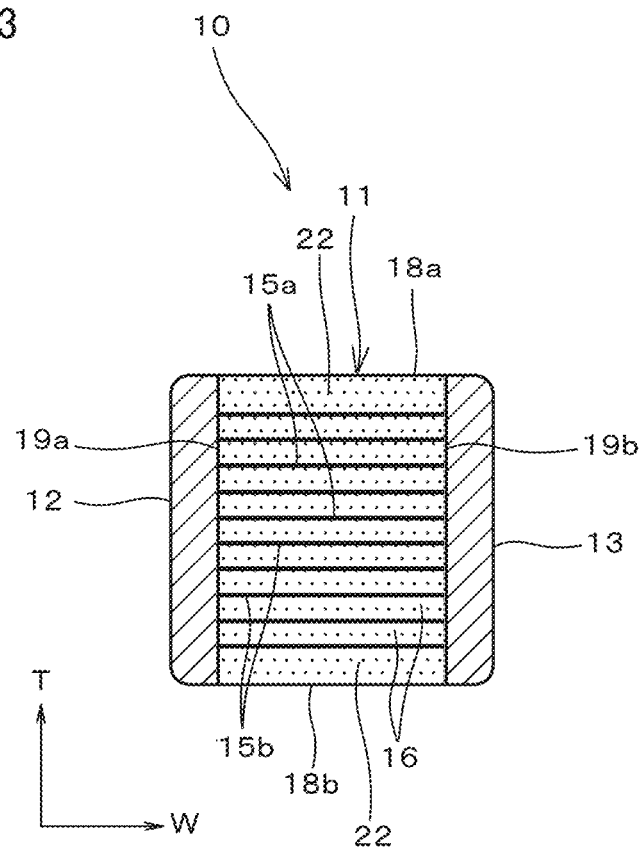
FIG. 3 is a view of the multilayer ceramic capacitor shown in FIG. 1 in a cross section taken along a line III-III.
Figure 4:
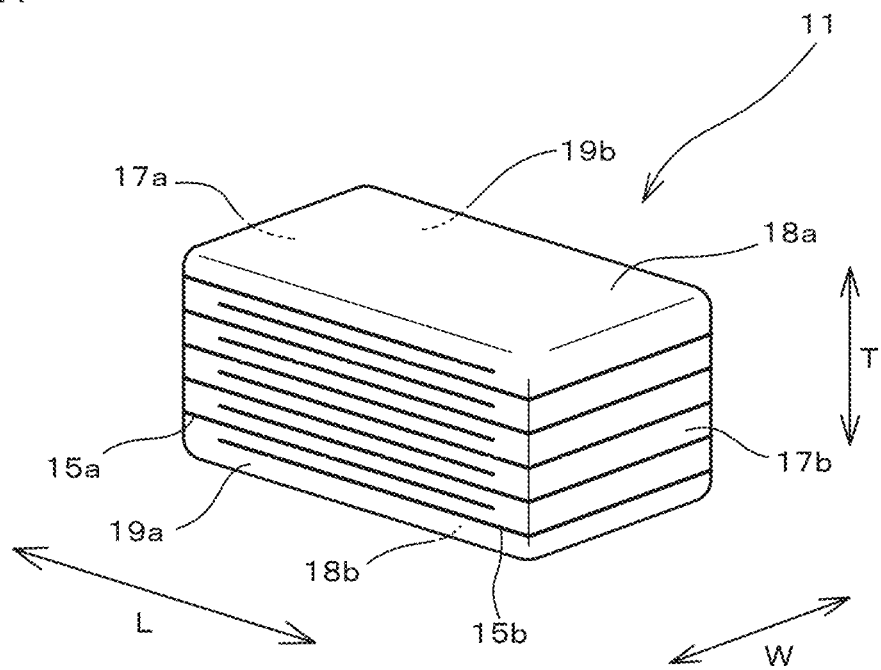
FIG. 4 is a perspective view of a multilayer body forming the multilayer ceramic capacitor.

FIG. 1 is a perspective view showing a multilayer ceramic capacitor 10 as an example of an electronic component. FIG. 2 is a view of multilayer ceramic capacitor 10 shown in FIG. 1 in a cross section taken along a line II-II. FIG. 3 is a view of multilayer ceramic capacitor 10 shown in FIG. 1 in a cross section taken along a line III-III. FIG. 4 is a perspective view of a multilayer body 11 forming multilayer ceramic capacitor 10.

As shown in FIGS. 1 to 3, multilayer ceramic capacitor 10 has a rectangular parallelepiped or substantially rectangular parallelepiped shape, and includes a multilayer body 11, a first insulating layer 12, a second insulating layer 13, a first external electrode 14a, and a second external electrode 14b. First external electrode 14a and second external electrode 14b face each other as shown in FIG. 1.

Accordingly, the direction in which first external electrode 14a and second external electrode 14b face each other is defined as a length direction L of multilayer ceramic capacitor 10. The direction in which a first internal electrode 15a and a second internal electrode 15b (described herein) are stacked on each other is defined as a stacking direction T. The direction orthogonal or substantially orthogonal to each of length direction L and stacking direction T is defined as a width direction W. As shown in FIG. 1, length direction L is orthogonal or substantially orthogonal to stacking direction T and width direction W.

Multilayer ceramic capacitor 10 includes a corner portion and a ridgeline portion, each of which is rounded. The corner portion is a portion at which three planes of multilayer ceramic capacitor 10 cross each other. The ridgeline portion is a portion at which two planes of multilayer ceramic capacitor 10 cross each other.

As shown in FIG. 4, multilayer body 11 includes a first end surface 17a and a second end surface 17b that face each other in length direction L, a first main surface 18a and a second main surface 18b that face each other in stacking direction T, and a first side surface 19a and a second side surface 19b that face each other in width direction W.

First end surface 17a and second end surface 17b extend in width direction W and stacking direction T. First main surface 18a and second main surface 18b extend in length direction L and width direction W. First side surface 19a and second side surface 19b extend in length direction L and stacking direction T.

As shown in FIGS. 2 and 3, multilayer body 11 includes an inner layer portion 21 and an outer layer portion 22.

Inner layer portion 21 includes internal electrodes 15a, 15b and a dielectric layer 16. The internal electrodes include a first internal electrode 15a and a second internal electrode 15b. Dielectric layer 16 is sandwiched between first internal electrode 15a and second internal electrode 15b. A plurality of first internal electrodes 15a and a plurality of second internal electrodes 15b are alternately stacked on one another with dielectric layer 16 interposed between the plurality of first internal electrodes 15a and the plurality of second internal electrodes 15b, to thus define inner layer portion 21.

First internal electrode 15a and second internal electrode 15b face each other in stacking direction T with dielectric layer 16 interposed between the plurality of first internal electrodes 15a and the plurality of second internal electrodes 15b. Capacitance occurs by the portion where first internal electrode 15a and second internal electrode 15b face each other with dielectric layer 16 interposed provided between the plurality of first internal electrodes 15a and the plurality of second internal electrodes 15b.

Dielectric layer 16 includes a plurality of crystalline particles each preferably including Ba and Ti, and each having a perovskite-type structure, for example.

Dielectric layer 16 extends in width direction W and length direction L. First internal electrode 15a has a flat plate shape along dielectric layer 16 and extends to first end surface 17a of multilayer body 11. Second internal electrode 15b has a flat plate shape along dielectric layer 16 and extend to second end surface 17b of multilayer body 11.

Furthermore, first internal electrode 15a and second internal electrode 15b are exposed at each of first side surface 19a and second side surface 19b of multilayer body 11.

First internal electrode 15a and second internal electrode 15b each preferably include Ni, for example. In addition to Ni, first internal electrode 15a and second internal electrode 15b each may include metal such as Cu, Ag, Pd, an Ag—Pd alloy, and Au, for example. Furthermore, first internal electrode 15a and second internal electrode 15b each may include the same or similar dielectric particles as those of dielectric layer 16.

Outer layer portion 22 is provided on both sides of inner layer portion 21 in stacking direction T, and more specifically, provided on both sides of the internal electrodes in stacking direction T that are located on both outermost sides in stacking direction T among the plurality of first internal electrodes 15a and the plurality of second internal electrodes 15b. In other words, inner layer portion 21 is sandwiched between two outer layer portions 22 provided on both outsides in stacking direction T. Outer layer portion 22 is a region in which first internal electrode 15a and second internal electrode 15b are not provided in a view, seen in length direction L, of an optional cross section of multilayer body 11 that extends in stacking direction T and width direction W. Outer layer portion 22 preferably includes the same or similar material as that of dielectric layer 16, for example.

First insulating layer 12 is in contact with first side surface 19a of multilayer body 11 to cover first side surface 19a. Second insulating layer 13 is in contact with second side surface 19b of multilayer body 11 to cover second side surface 19b. In other words, multilayer body 11 is sandwiched between first insulating layer 12 and second insulating layer 13 from both sides in width direction W.

As described below, first insulating layer 12 and second insulating layer 13 each preferably have a two-layer structure. However, first insulating layer 12 and second insulating layer 13 each may include three or more layers or may include one layer. Furthermore, the material of each of first insulating layer 12 and second insulating layer 13 may be the same as or different from that of dielectric layer 16.

As shown in FIG. 1, first external electrode 14a is provided over the entire or substantially the entire first end surface 17a of multilayer body 11 and over the entire or substantially the entire ends of first insulating layer 12 and second insulating layer 13 on the first end surface 17a side, and extends therefrom partially over both outsides in stacking direction T and both outsides in width direction W. First external electrode 14a is electrically connected to first internal electrode 15a.

As shown in FIG. 1, second external electrode 14b is provided over the entire or substantially the entire second end surface 17b of multilayer body 11 and over the entire or substantially the entire ends of first insulating layer 12 and second insulating layer 13 on the second end surface 17b side, and extends therefrom partially over both outsides in stacking direction T and both outsides in width direction W. Second external electrode 14b is electrically connected to second internal electrode 15b.

First external electrode 14a and second external electrode 14b each include an underlying electrode layer and a plated layer that is provided on the underlying electrode layer, for example.

The underlying electrode layer preferably includes at least one of layers as a baked electrode layer, a resin electrode layer, and a thin electrode layer, for example, as will be described below.

The baked electrode layer may include glass and metal, and may include one layer or two or more layers. The baked electrode layer preferably includes metal such as Cu, Ni, Ag, Pd, and Au, or an alloy of Ag and Pd, for example.

The baked electrode layer is formed by baking a multilayer body to which an electrically conductive paste including glass and metal has been applied. Baking may be performed simultaneously or substantially simultaneously with firing of the unfired multilayer body or may be performed after firing of the unfired multilayer body.

The resin electrode layer may be formed as a layer including electrically conductive particles and a thermosetting resin, for example. When the resin electrode layer is provided, the resin electrode layer may be provided directly on the multilayer body without providing a baked electrode layer. The number of resin electrode layers may be one or may be more than one.

The thin electrode layer is a layer formed by deposition of metal particles and preferably having a thickness of 1 μm or less, for example. The thin electrode layer may be formed by known thin-film forming methods, for example, a sputtering method or an evaporation method.

The plated layer provided on the underlying electrode layer preferably includes at least one of metal such as Cu, Ni, Ag, Pd, and Au, or an alloy of Ag and Pd, for example. The number of plated layers may be one or may be more than one. The plated layer preferably includes a two-layer structure including an Ni-plated layer and an Sn-plated layer, for example. The Ni-plated layer significantly reduces or prevents the underlying electrode layer from being eroded by the solder to mount multilayer ceramic capacitor 10. The Sn-plated layer significantly increases the wettability of the solder that mounts multilayer ceramic capacitor 10.

First external electrode 14a and second external electrode 14b do not have to include the above-described underlying electrode layer, but may include a plated layer that is to be directly provided on multilayer body 11. Accordingly, the plated layer is directly connected to first internal electrode 15a or second internal electrode 15b.

Method of Manufacturing Multilayer Ceramic Capacitor

Figure 5:
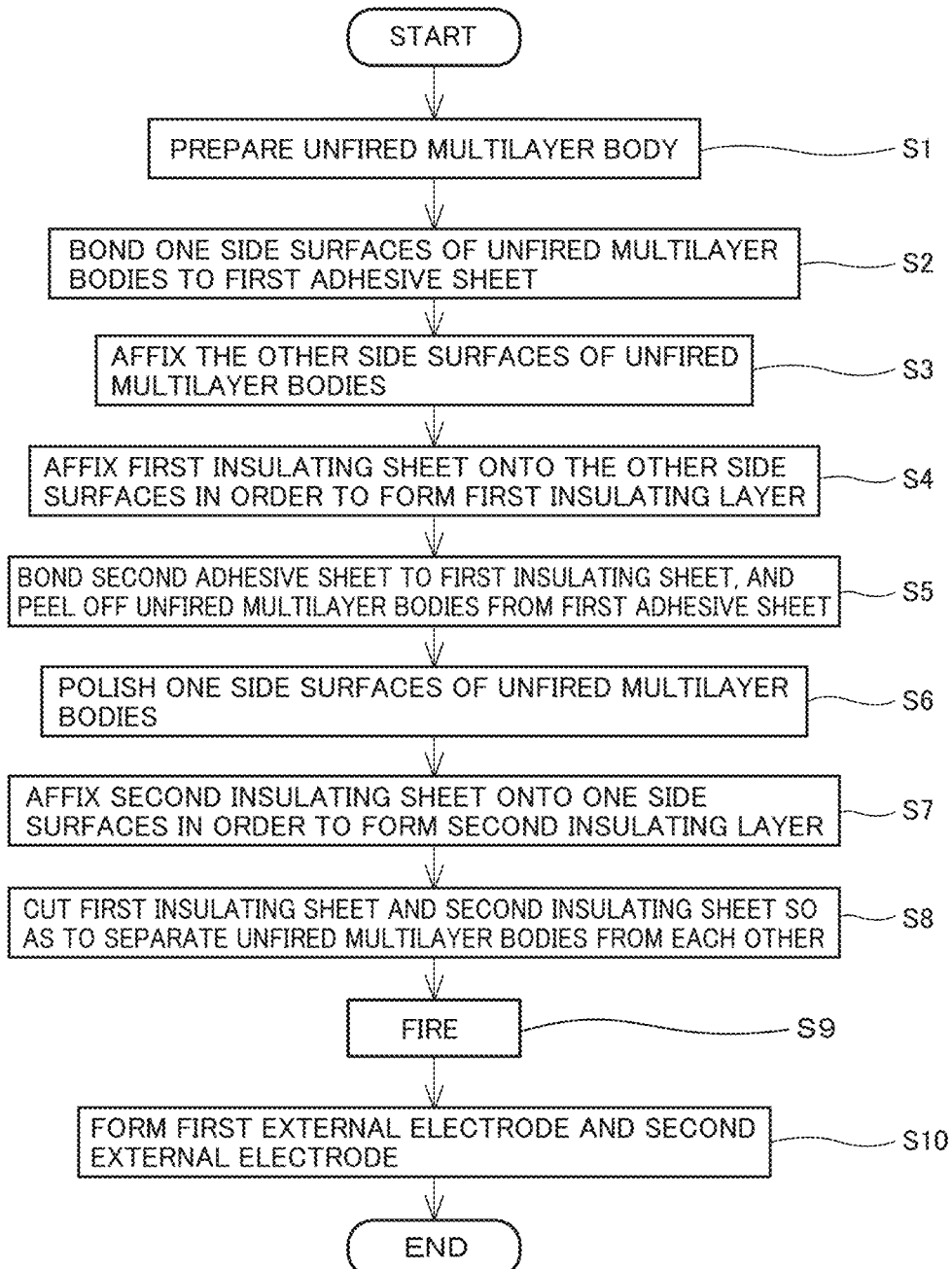
FIG. 5 is a flowchart showing an example of the steps of manufacturing a multilayer ceramic capacitor according to a preferred embodiment of the present invention.

The following is an explanation of an example of a method of manufacturing multilayer ceramic capacitor 10 having the above-described structure. FIG. 5 is a flowchart showing an example of the steps of manufacturing multilayer ceramic capacitor 10 according to a preferred embodiment of the present invention.

In step S1 in FIG. 5, an unfired multilayer body that is to be formed as multilayer body 11 after firing is prepared. The unfired multilayer body may be prepared in advance or may be produced by conventionally known methods. For example, a plurality of ceramic green sheets each including an electrically conductive paste for internal electrodes applied thereto are stacked on one another and cut into pieces each having a prescribed size. Thus, an unfired multilayer body is able to be produced.

Figure 6:
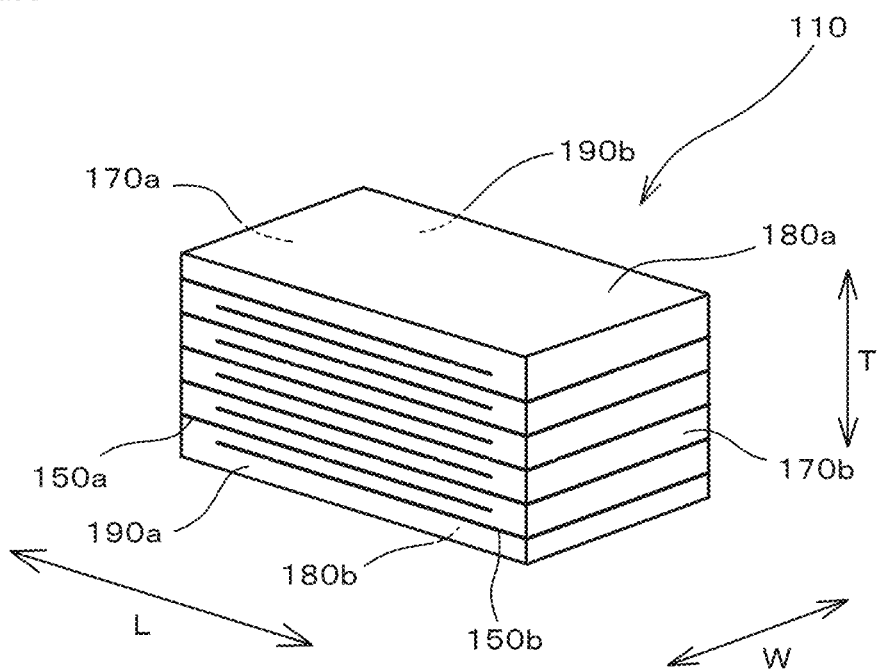
FIG. 6 is a perspective view of an unfired multilayer body.

FIG. 6 is a perspective view of an unfired multilayer body 110. Unfired multilayer body 110 includes a first main surface 180a and a second main surface 180b that face each other in stacking direction T; a first side surface 190a and a second side surface 190b that face each other in width direction W orthogonal or substantially orthogonal to stacking direction T; and a first end surface 170a and a second end surface 170b that face each other in length direction L orthogonal or substantially orthogonal to stacking direction T and width direction W.

At first end surface 170a of unfired multilayer body 110, the first internal electrode before firing (that is, a first unfired internal electrode 150a) is exposed. At second end surface 170b of unfired multilayer body 110, the second internal electrode before firing (that is, a second unfired internal electrode 150b) is exposed. Also, first unfired internal electrode 150a and second unfired internal electrode 150b are exposed at each of first side surface 190a and second side surface 190b of unfired multilayer body 110.

In step S2 after step S1, one side surface of first side surface 190a and second side surface 190b of each unfired multilayer body 110 is bonded to the first adhesive sheet. In the following description, one side surface of first side surface 190a and second side surface 190b is defined as second side surface 190b while the other side surface of first side surface 190a and second side surface 190b is defined as first side surface 190a, but one side surface may be defined as first side surface 190a while the other side surface may be defined as second side surface 190b.

The method of bonding second side surface 190b as one side surface of each of the plurality of unfired multilayer bodies 110 to the first adhesive sheet is not particularly limited.

Figure 7:
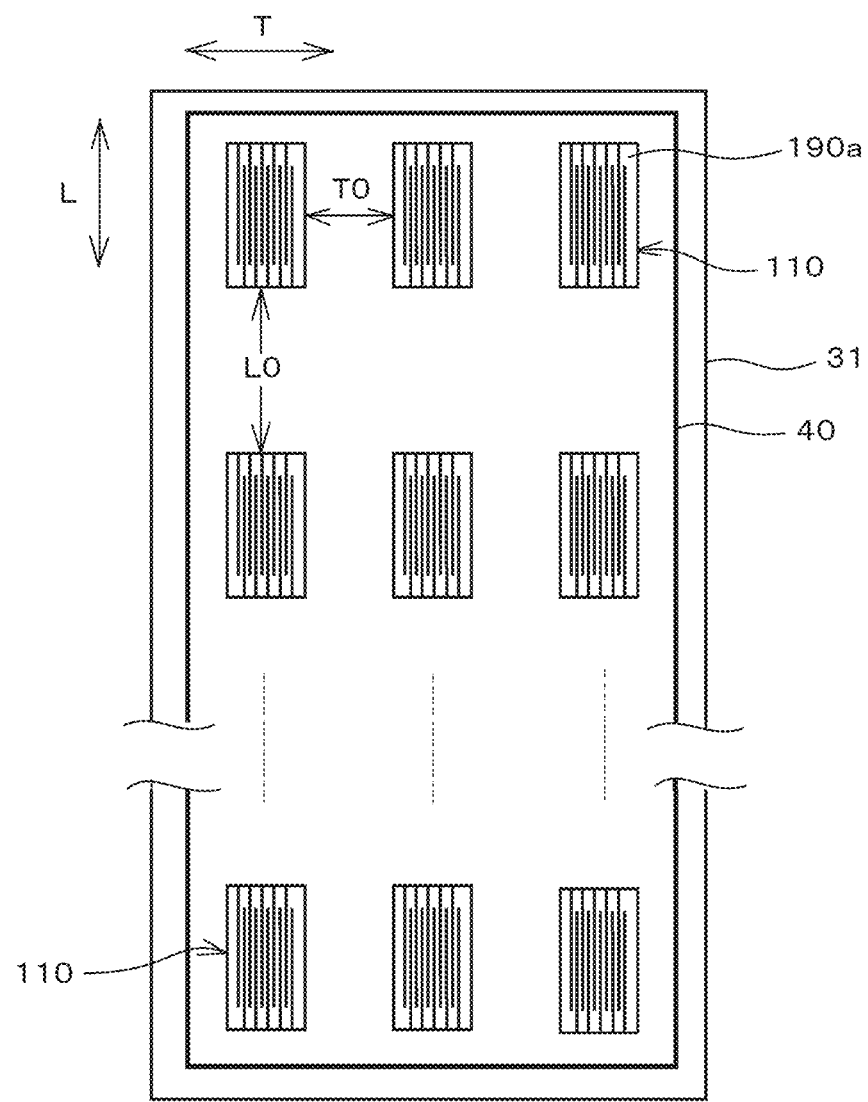
FIG. 7 is a plan view showing the state where the second side surface as one side surface of each of a plurality of unfired multilayer bodies is bonded to the first adhesive sheet.

FIG. 7 is a diagram showing the state where second side surface 190b as one side surface of each of the plurality of unfired multilayer bodies 110 is bonded to first adhesive sheet 31. In this state, first side surface 190a as the other side surface of each unfired multilayer body 110 is exposed.

In the present preferred embodiment, first adhesive sheet 31 is described as having an elongated shape without limitation. Furthermore, any number of unfired multilayer bodies 110 may be bonded to first adhesive sheet 31.

As shown in FIG. 7, a plurality of unfired multilayer bodies 110 are bonded in a matrix configuration to first adhesive sheet 31. In the present preferred embodiment, a distance L0 between two unfired multilayer bodies 110 located adjacent to each other in length direction L of unfired multilayer body 110 is substantially equal to or greater than the dimension of unfired multilayer body 110 in length direction L. Also, a distance T0 between two unfired multilayer bodies 110 located adjacent to each other in stacking direction T of unfired multilayer body 110 is substantially equal to or greater than the dimension of unfired multilayer body 110 in stacking direction T.

However, distance L0 between two unfired multilayer bodies 110 located adjacent to each other in length direction L of unfired multilayer body 110 may be less than the dimension of unfired multilayer body 110 in length direction L. Furthermore, distance T0 between two unfired multilayer bodies 110 located adjacent to each other in stacking direction T of unfired multilayer body 110 may be less than the dimension of unfired multilayer body 110 in stacking direction T.

Figure 8:
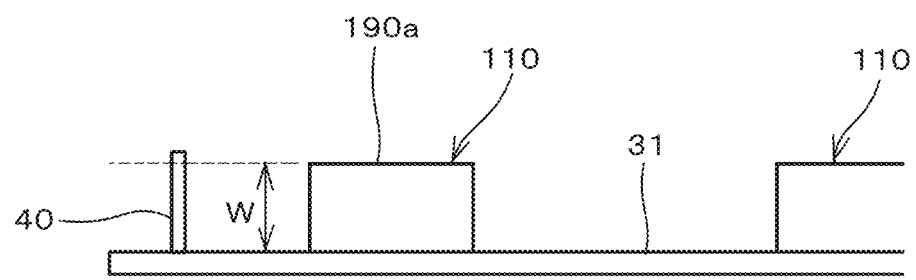
FIG. 8 is a side view showing an unfired multilayer body and a bank that are bonded to the first adhesive sheet.

Furthermore, in the present preferred embodiment, a bank 40 surrounding the plurality of unfired multilayer bodies 110 is provided on the surface of first adhesive sheet 31 to which unfired multilayer bodies 110 are bonded. Bank 40 is formed to have a height substantially equal to or greater than the dimension of each unfired multilayer body 110 in width direction W. FIG. 8 is a side view showing unfired multilayer body 110 and bank 40 that are bonded to first adhesive sheet 31. In FIG. 8, the height of bank 40 is greater than the dimension of unfired multilayer body 110 in width direction W, but may be the same or substantially the same as the dimension of unfired multilayer body 110 in width direction W. In addition, the height of bank 40 means the dimension of bank 40 in the direction orthogonal or substantially orthogonal to the main surface of first adhesive sheet 31. The corner portion of bank 40 is preferably provided with, for example, a gap, through which a polishing solution flows in.

As will be described herein, a rotary polishing machine polishes the other side surface of unfired multilayer body 110. Accordingly, polishing impact causes a strong flow of the polishing solution. Due to this flow of the polishing solution, unfired multilayer body 110 may peel off and fly away from first adhesive sheet 31. However, with bank 40 provided to surround the plurality of unfired multilayer bodies 110, an excessive flow of the polishing solution is able to be significantly reduced or prevented, dispersion of unfired multilayer bodies 110 that fly away during polishing is able to be significantly reduced or prevented, and also, unfired multilayer bodies 110 that fly away are able to be readily collected.

In step S3 after step S2 in FIG. 5, the polishing surface of the rotary polishing machine is rotated while being in contact with the other side surface of first side surface 190a and second side surface 190b of each unfired multilayer body 110, to polish the other side surface of each unfired multilayer body 110. In other words, in the state where one side surface is bonded to the adhesive sheet, the other side surface is exposed, and therefore, polished.

Figure 9:
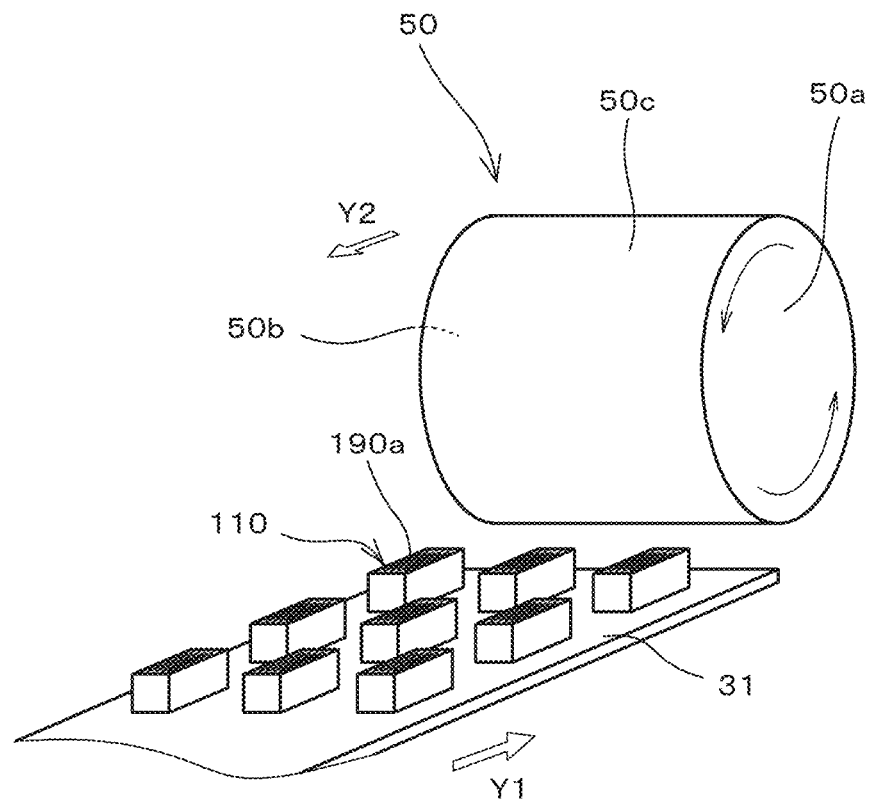
FIG. 9 is a diagram showing the state where a rotary polishing machine polishes the first side surfaces as the other side surfaces of the unfired multilayer bodies.

FIG. 9 is a diagram showing the state where a rotary polishing machine 50 polishes first side surfaces 190a as the other side surfaces of unfired multilayer bodies 110. It should be noted that FIG. 9 does not show bank 40 on first adhesive sheet 31.

Rotary polishing machine 50 has a cylindrical or substantially cylindrical shape including two circular or substantially circular surfaces 50a, 50b and an outer circumferential surface 50c that is located between two circular or substantially circular surfaces 50a and 50b. Outer circumferential surface 50c defines and functions as a polishing surface. When polishing first side surface 190a of unfired multilayer body 110, outer circumferential surface 50c is rotated in the state where this outer circumferential surface 50c is in contact with first side surface 190a of unfired multilayer body 110, to thus polish first side surface 190a. As shown in FIG. 7, a plurality of unfired multilayer bodies 110 are bonded onto first adhesive sheet 31 in stacking direction T of each of unfired multilayer bodies 110. Thus, first side surfaces 190a of the plurality of unfired multilayer bodies 110 provided in rows are able to be simultaneously or substantially simultaneously polished.

Accordingly, during polishing by rotary polishing machine 50, at least one of rotary polishing machine 50 and first adhesive sheet 31 is moved relative to the other of rotary polishing machine 50 and first adhesive sheet 31, and a polish groove is formed in length direction L on the side surface of each unfired multilayer body 110 with which the polishing surface comes into contact. The polish groove is formed in the direction in which the polishing surface of rotary polishing machine 50 moves relative to the other side surface of each unfired multilayer body 110. Accordingly, at least one of rotary polishing machine 50 and first adhesive sheet 31 is moved relative to the other of rotary polishing machine 50 and first adhesive sheet 31 in length direction L of each unfired multilayer body 110. A polishing solution is preferably introduced during polishing, for example.

In a polishing example shown in FIG. 9, the tangent line of outer circumferential surface 50c in its rotation direction extends in the same or substantially the same direction as length direction L of unfired multilayer body 110 at a contact position between first side surface 190a as the other side surface of unfired multilayer body 110 and outer circumferential surface 50c as a polishing surface of rotary polishing machine 50. In this state, when first adhesive sheet 31 is moved in the direction indicated by an arrow Y1 in which the plurality of unfired multilayer bodies 110 approach rotary polishing machine 50, or when first adhesive sheet 31 is moved in the direction indicated by an arrow Y2 in which rotary polishing machine 50 approaches the plurality of unfired multilayer bodies 110, a polish groove is formed in length direction L on the side surface of each of unfired multilayer bodies 110. Also, first adhesive sheet 31 may be moved in the direction indicated by arrow Y1 and rotary polishing machine 50 may be moved in the direction indicated by arrow Y2.

Figure 10:
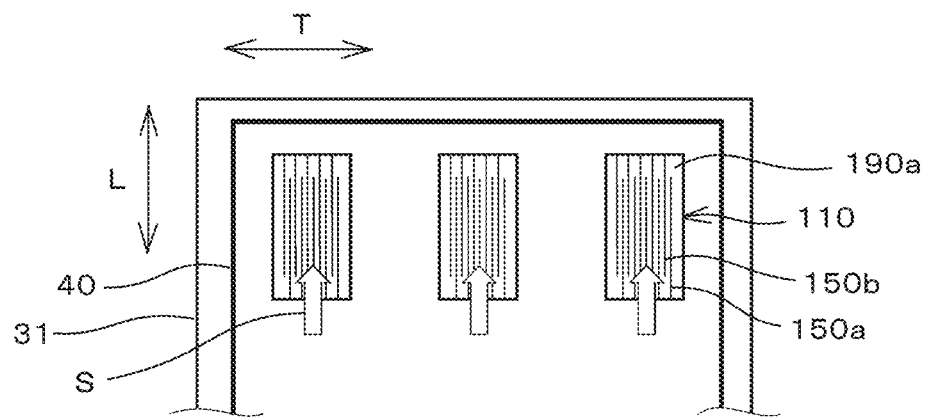
FIG. 10 is a diagram showing the extending direction of a polish groove that is provided on the first side surface as the other side surface of each unfired multilayer body during polishing by the rotary polishing machine.

FIG. 10 is a diagram showing an extending direction S of the polish groove that is provided on first side surface 190a as the other side surface of each unfired multilayer body 110 during polishing by rotary polishing machine 50. As shown in FIG. 10, extending direction S of the polish groove formed on first side surface 190a of unfired multilayer body 110 extends in the same or substantially the same direction as length direction L of unfired multilayer body 110. In other words, by aligning extending direction S of the polish groove formed on first side surface 190a of unfired multilayer body 110 to extend in the same or substantially the same direction as the extending direction of each of first unfired internal electrode 150a and second unfired internal electrode 150b that are exposed at first side surface 190a, occurrence of polishing sag in first unfired internal electrode 150a and second unfired internal electrode 150b is able to be significantly reduced or prevented.

On the other hand, at least one of rotary polishing machine 50 and first adhesive sheet 31 is moved relative to the other of rotary polishing machine 50 and first adhesive sheet 31, and extending direction S of the polish groove formed on the other side surface of unfired multilayer body 110 is orthogonal or substantially orthogonal to length direction L of unfired multilayer body 110 (that is, the extending direction of each of first unfired internal electrode 150a and second unfired internal electrode 150b that are exposed). As a result, polishing sag is more likely to occur in first unfired internal electrode 150a and second unfired internal electrode 150b.

Figure 11:
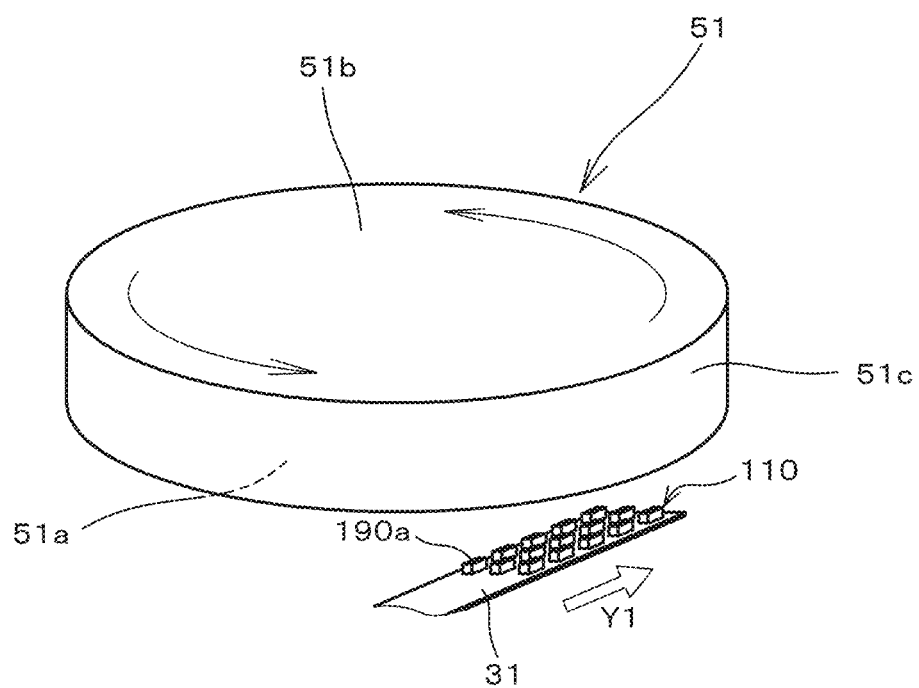
FIG. 11 is a perspective view showing the state where another rotary polishing machine polishes the first side surfaces as the other side surfaces of the plurality of unfired multilayer bodies.
Figure 12:
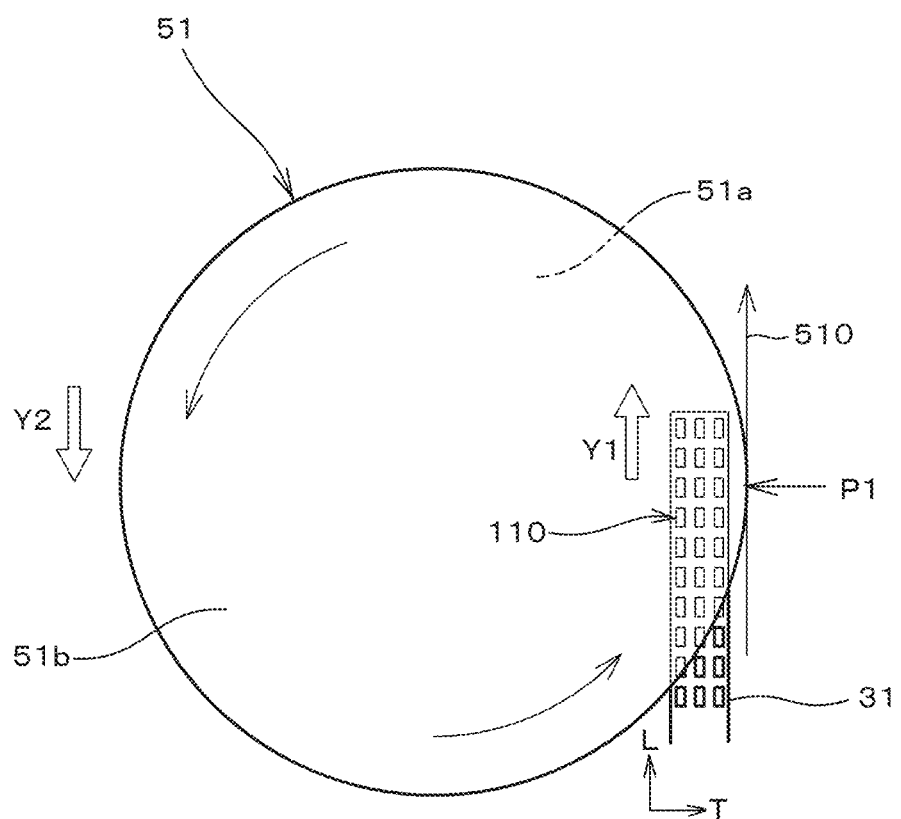
FIG. 12 is a top view showing the positional relation between the rotary polishing machine and the plurality of unfired multilayer bodies.

FIG. 11 is a perspective view showing the state where another rotary polishing machine 51 polishes first side surfaces 190a as the other side surfaces of the plurality of unfired multilayer bodies 110. FIG. 12 is a top view showing the positional relation between rotary polishing machine 51 and the plurality of unfired multilayer bodies 110.

Rotary polishing machine 51 shown in FIGS. 11 and 12 has a cylindrical or substantially cylindrical shape including two circular or substantially circular surfaces 51a and 51b that face each other. Accordingly, surface 51a defines and functions as a polishing surface.

In addition, during polishing by rotary polishing machine 51, at least one of rotary polishing machine 51 and first adhesive sheet 31 is moved relative to the other of rotary polishing machine 51 and first adhesive sheet 31, and a polish groove is formed in length direction L on the side surface of each unfired multilayer body 110 with which the polishing surface comes into contact.

Each unfired multilayer body 110 is polished at the position where the rotation direction of the polishing surface extends in the same or substantially the same direction as length direction L of each unfired multilayer body 110. In other words, each unfired multilayer body 110 is polished at the position located as close as possible to a position P1 at which the direction of a tangent line 510 of circular or substantially circular surface 51a as the polishing surface of rotary polishing machine 51 extends in the same or substantially the same direction as length direction L of unfired multilayer body 110. By polishing each unfired multilayer body 110 at such a position, a polish groove is formed in length direction L on the side surface of each unfired multilayer body 110 with which the polishing surface comes into contact. In order to polish the plurality of unfired multilayer bodies 110 bonded to first adhesive sheet 31, first adhesive sheet 31 may be moved in the direction indicated by an arrow Y1 in FIG. 12 or rotary polishing machine 51 may be moved in the direction indicated by an arrow Y2 in FIG. 12. Also, first adhesive sheet 31 may be moved in the direction indicated by arrow Y1 and rotary polishing machine 51 may be moved in the direction indicated by arrow Y2.

For polishing, the extending direction of the polish groove formed on the other side surface of each unfired multilayer body 110 and length direction L do not necessarily extend completely in the same or substantially the same direction, but may extend approximately in the same or substantially the same direction.

Figure 13:
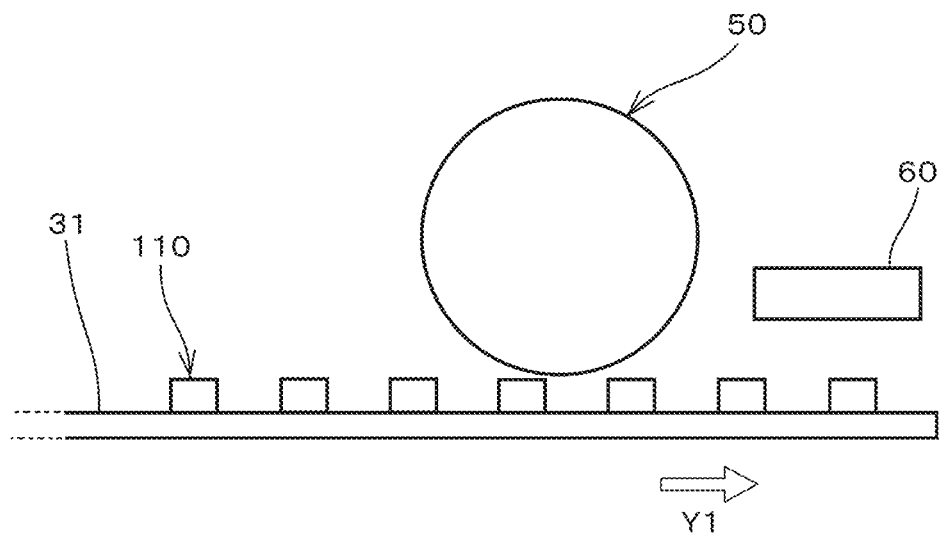
FIG. 13 is a side view showing the plurality of unfired multilayer bodies bonded to the first adhesive sheet, the rotary polishing machine, and a magnet.

In the present preferred embodiment, as shown in FIG. 13, a magnet 60 is provided to attract unfired multilayer body 110 that is peeled off from first adhesive sheet 31 due to polishing by rotary polishing machine 50. In the case where first adhesive sheet 31 is conveyed in the direction indicated by an arrow Y1 in FIG. 13, the side on which unfired multilayer body 110 before polishing is located is defined as an upstream side while the side on which unfired multilayer body 110 after polishing is located is defined as a downstream side. Accordingly, magnet 60 is preferably located on the downstream side, for example. First unfired internal electrode 150a and second unfired internal electrode 150b each preferably including Ni, for example, are exposed on each of first side surface 190a and second side surface 190b of unfired multilayer body 110. Thus, unfired multilayer body 110 flown away due to impact during polishing are able to be attracted to magnet 60. Thereby, unfired multilayer bodies 110 flown away during polishing is able to be significantly reduced or prevented from dispersing and are able to be readily collected.

The same or similar features and advantageous effects are applicable also to the case where rotary polishing machine 50 shown in FIG. 10 is used in place of rotary polishing machine 50 shown in FIG. 9.

In step S4 after step S3 in FIG. 5, the first insulating sheet is affixed onto the polished other side surface of each unfired multilayer body 110 in order to form the first insulating layer. Accordingly, one first insulating sheet is affixed to cover the other side surfaces of the plurality of unfired multilayer bodies 110.

Figure 14:
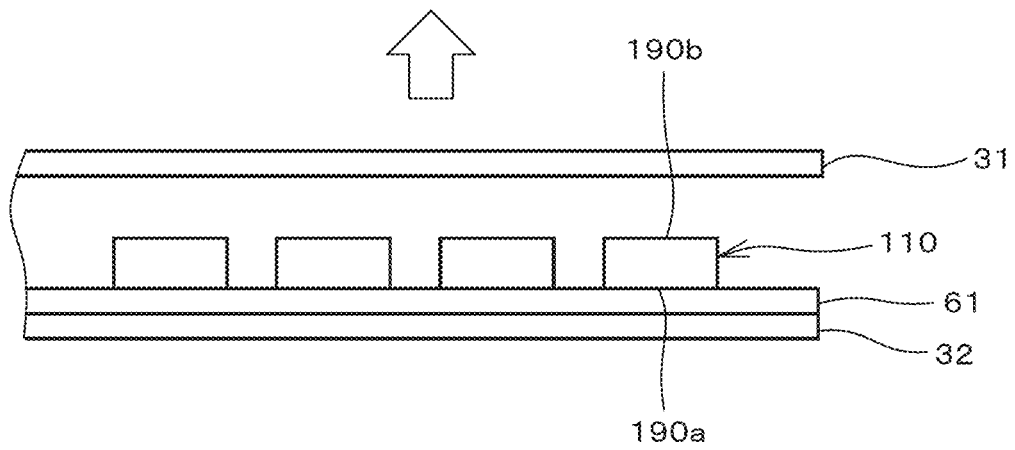
FIG. 14 is a diagram showing the state where the unfired multilayer bodies on the first insulating sheet having the second adhesive sheet bonded thereto are peeled off from the first adhesive sheet.

In step S5 after step S4 in FIG. 5, the second adhesive sheet is first bonded to the first insulating sheet, and then, first adhesive sheet 31 is peeled off. The second adhesive sheet is preferably higher in adhesive strength than first adhesive sheet 31, for example. FIG. 14 is a diagram showing the state where unfired multilayer bodies 110 on first insulating sheet 61 having second adhesive sheet 32 bonded thereto are peeled off from first adhesive sheet 31.

The method of peeling off unfired multilayer bodies 110 from first adhesive sheet 31 is not limited to the above-described method. The adhesive strength of first adhesive sheet 31 may be weakened before the first adhesive sheet is peeled off. For example, when first adhesive sheet 31 includes the material having adhesive strength that is weakened by heating, first adhesive sheet 31 is heated. When first adhesive sheet 31 includes the material having adhesive strength that is weakened by ultraviolet irradiation, first adhesive sheet 31 is irradiated with ultraviolet rays.

Step S6 after step S5 in FIG. 5 includes polishing one side surfaces of unfired multilayer bodies 110 that are exposed as a result of peeling off of first adhesive sheet 31. Second side surface 190b as one side surface is polished by the method similar to the method to polish first side surface 190a as the other side surface. In other words, at least one of the rotary polishing machine and second adhesive sheet 32 is moved relative to the other of the rotary polishing machine and second adhesive sheet 32 that polishes, and a polish groove is formed in length direction L on one side surface of unfired multilayer body 110. Thereby, occurrence of polishing sag is able to be significantly reduced or prevented in first unfired internal electrode 150a and second unfired internal electrode 150b also on one side surface of each unfired multilayer body 110.

In step S7 after step S6 in FIG. 5, the second insulating sheet is affixed onto the polished one side surface of each unfired multilayer body 110 in order to form the second insulating layer. Accordingly, one second insulating sheet is affixed to cover one side surfaces of the plurality of unfired multilayer bodies 110.

In step S8 after step S7, first insulating sheet 61 and second insulating sheet 62 are cut to separate unfired multilayer bodies 110 from each other. Specifically, in the state where one first insulating sheet 61 is affixed onto the other side surfaces of the plurality of unfired multilayer bodies 110 and one second insulating sheet 62 is affixed onto one side surfaces of the plurality of unfired multilayer bodies 110, pressing force is applied from outside first insulating sheet 61 and second insulating sheet 62 to unfired multilayer bodies 110. Thereby, first insulating sheet 61 and second insulating sheet 62 are cut to separate unfired multilayer bodies 110 from each other.

Figure 15A:
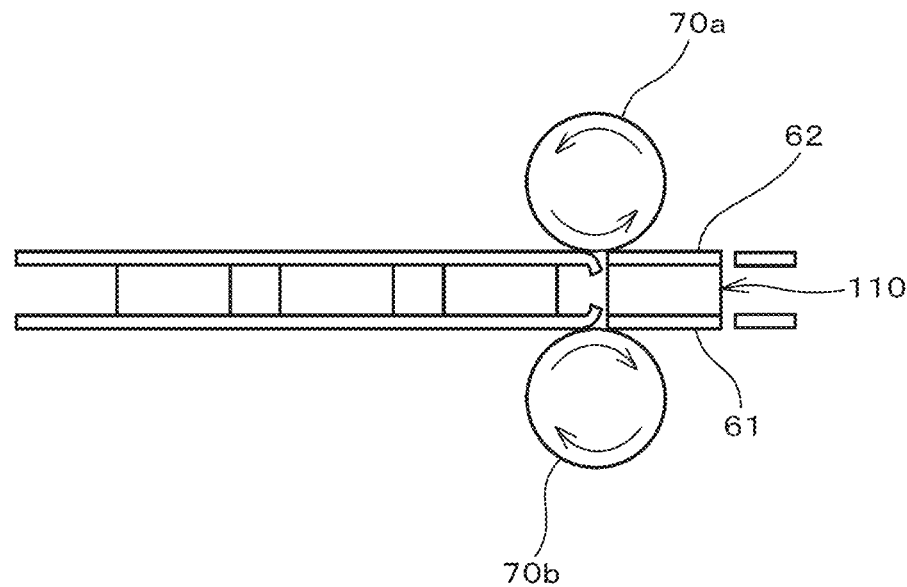
FIGS. 15A and 15B each are a diagram showing an example of a method of cutting the first insulating sheet and the second insulating sheet to separate the unfired multilayer bodies from each other.
Figure 15B:
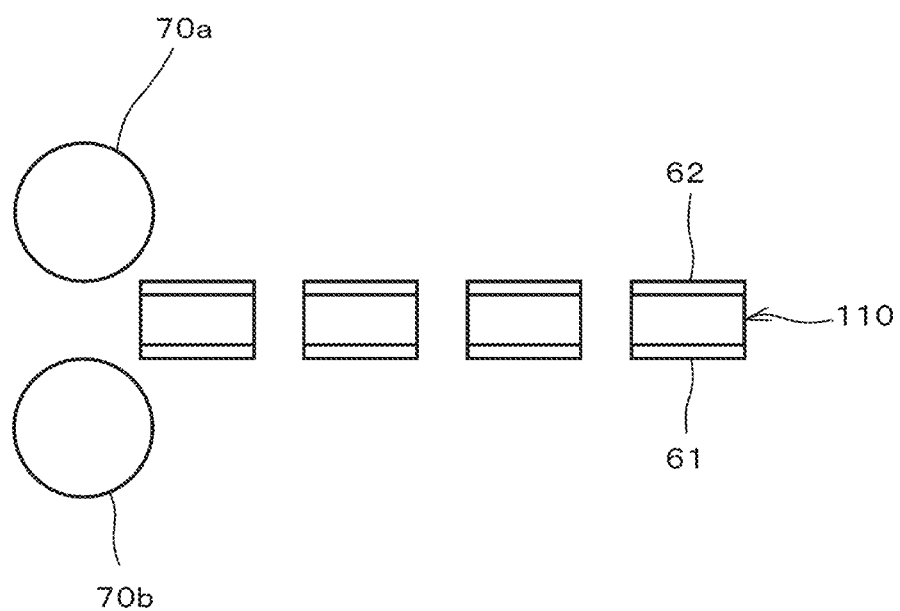

FIGS. 15A and 15B each are a diagram showing an example of a method of cutting first insulating sheet 61 and second insulating sheet 62 to separate unfired multilayer bodies 110 from each other. As shown in FIG. 15A, first insulating sheet 61, unfired multilayer bodies 110 and second insulating sheet 62 are sandwiched between a pair of rollers 70a and 70b. In this state, while rotating the pair of rollers 70a and 70b, pressing force is applied to unfired multilayer bodies 110 from outside first insulating sheet 61 and second insulating sheet 62.

Accordingly, shear force is applied to each of first insulating sheet 61 and second insulating sheet 62 between the region in contact with unfired multilayer body 110 and the region not in contact with unfired multilayer body 110. By this shear force, first insulating sheet 61 and second insulating sheet 62 are cut between the region in contact with unfired multilayer body 110 and the region not in contact with unfired multilayer body 110, as shown in FIG. 15B.

Figure 16A:
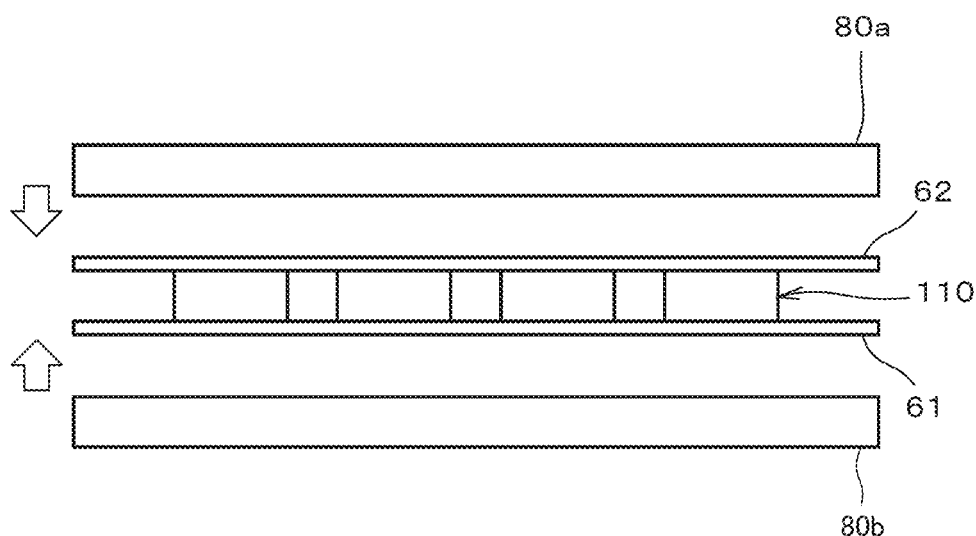
FIGS. 16A and 16B each are a diagram showing another method of cutting the first insulating sheet and the second insulating sheet to separate the unfired multilayer bodies from each other.
Figure 16B:
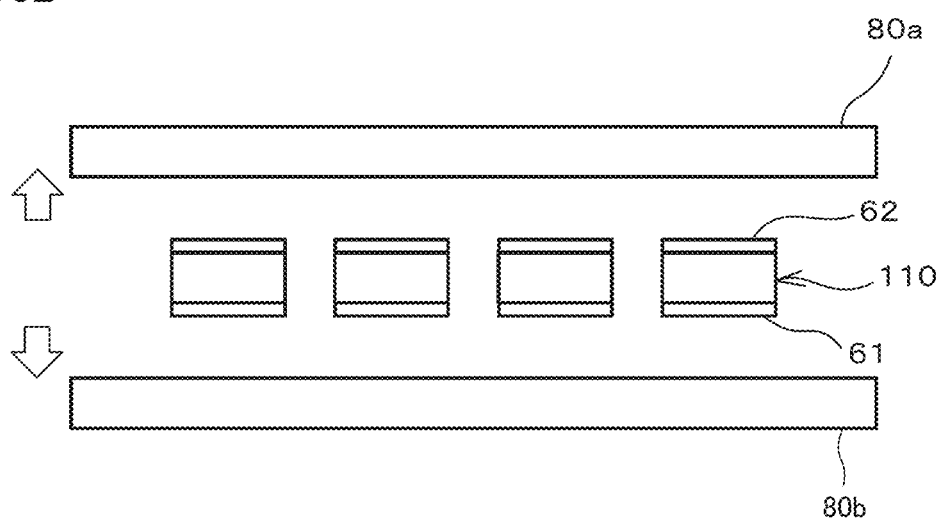

FIGS. 16A and 16B each are a diagram showing another method of cutting first insulating sheet 61 and second insulating sheet 62 to separate unfired multilayer bodies 110 from each other. As shown in FIG. 16A, first insulating sheet 61, unfired multilayer bodies 110 and second insulating sheet 62 are sandwiched between a pair of pressing elements 80a and 80b. The surfaces of pressing elements 80a and 80b that come into contact with at least first insulating sheet 61 or second insulating sheet 62 preferably include an elastic body, for example, rubber.

In the state where first insulating sheet 61, unfired multilayer bodies 110 and second insulating sheet 62 are sandwiched between the pair of pressing elements 80a and 80b, pressing force is applied to unfired multilayer bodies 110 from outside first insulating sheet 61 and second insulating sheet 62. Thus, shear force is applied to first insulating sheet 61 and second insulating sheet 62 between the region in contact with each unfired multilayer body 110 and the region not in contact with each unfired multilayer body 110. Thus, first insulating sheet 61 and second insulating sheet 62 are cut to separate unfired multilayer bodies 110 from each other as shown in FIG. 16B.

In step S9 after step S8 in FIG. 5, a structure body of unfired multilayer body 110 is fired that includes first side surface 190a to which the cut first insulating sheet 61 is affixed, and second side surface 190b to which the cut second insulating sheet 62 is affixed. By firing, unfired multilayer body 110 is formed into multilayer body 11, the cut first insulating sheet 61 is formed into first insulating layer 12, and the cut second insulating sheet 62 is formed into second insulating layer 13.

In step S10 after step S9, first external electrode 14a and second external electrode 14b are formed. Also, after applying an external electrode paste to unfired multilayer body 110 having the cut first insulating sheet 61 and the cut second insulating sheet 62 affixed thereto, the resultant may be simultaneously or substantially simultaneously fired.

Thus, multilayer ceramic capacitor 10 is provided by the above-described manufacturing steps.

The present invention is not limited to the above-described preferred embodiments, but may be variously applicable and modifiable in the scope of the present invention.

Figure 17:
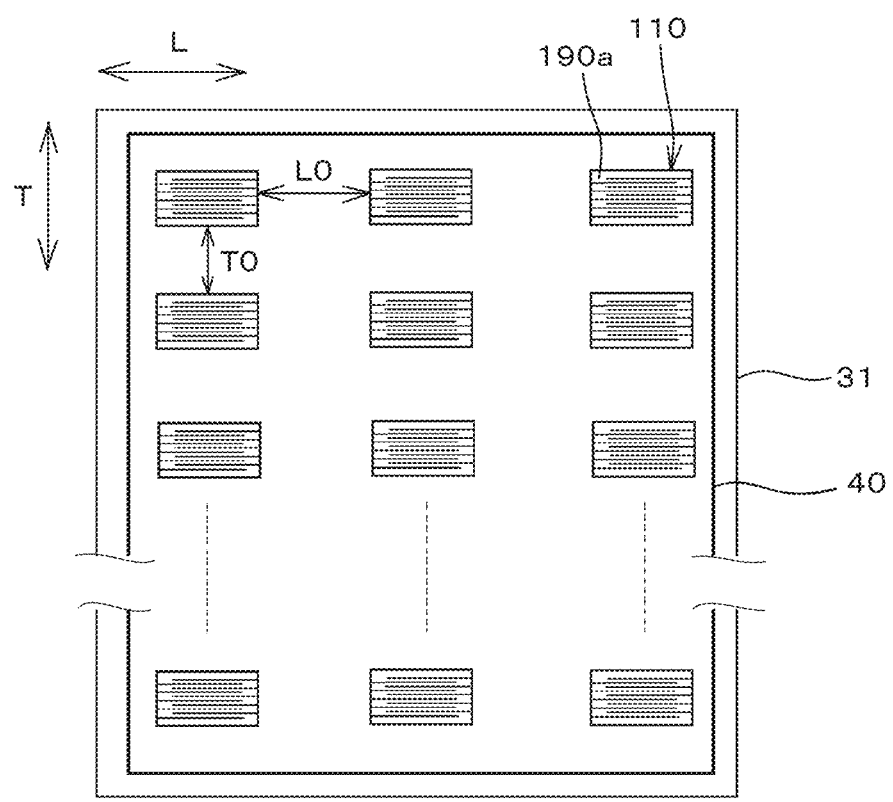
FIG. 17 is a plan view showing a plurality of unfired multilayer bodies bonded to the first adhesive sheet in a direction different by about 90° from the direction of unfired multilayer bodies shown in FIG. 7.

For example, unfired multilayer body 110 may be bonded to first adhesive sheet 31 in the direction different from the direction of unfired multilayer body 110 shown in FIG. 7. FIG. 17 is a diagram showing a plurality of unfired multilayer bodies 110 bonded to first adhesive sheet 31 in the direction different by about 90° from the direction of unfired multilayer bodies 110 shown in FIG. 7.

Also in the case where each of unfired multilayer bodies 110 is bonded to first adhesive sheet 31 in the direction shown in FIG. 17, distance L0 between two unfired multilayer bodies 110 located adjacent to each other in length direction L of each unfired multilayer body 110 is substantially equal to or greater than the dimension of each unfired multilayer body 110 in length direction L. Also, distance T0 between two unfired multilayer bodies 110 located adjacent to each other in stacking direction T of each unfired multilayer body 110 is substantially equal to or greater than the dimension of each unfired multilayer body 110 in stacking direction T. It should be noted that distance L0 between two unfired multilayer bodies 110 located adjacent to each other in length direction L of each unfired multilayer body 110 may be less than the dimension of each unfired multilayer body 110 in length direction L. Furthermore, distance T0 between two unfired multilayer bodies 110 located adjacent to each other in stacking direction T of each unfired multilayer body 110 may be less than the dimension of each unfired multilayer body 110 in stacking direction T.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of manufacturing an electronic component that is operatively associated with a rotary polishing machine, the electronic component including at least a multilayer body and an insulating layer that covers a side surface of the multilayer body, the multilayer body including a plurality of dielectric layers and a plurality of internal electrodes that are alternately stacked on one another, and the method comprising:

preparing an unfired multilayer body that is to be formed as the multilayer body after firing, the unfired multilayer body including:
a first main surface and a second main surface that are opposite to each other in a stacking direction;

a first side surface and a second side surface that are opposite to each other in a width direction orthogonal to the stacking direction; and a first end surface and a second end surface that are opposite to each other in a length direction orthogonal to the stacking direction and the width direction;

bonding one side surface of the first side surface and the second side surface of each unfired multilayer body to an adhesive sheet such that a plurality of the unfired multilayer bodies are disposed on the adhesive sheet in at least one row;

polishing the other side surface of the first side surface and the second side surface of each of the plurality of unfired multilayer bodies provided in the at least one row by rotating a polishing surface of the rotary polishing machine in a state where the polishing surface is in contact with the other side surface of each of the plurality of unfired multilayer bodies; and forming a first insulating layer on the polished other side surface; wherein in the polishing the other side surface, at least one of the rotary polishing machine and the adhesive sheet is moved relative to the other of the rotary polishing machine and the adhesive sheet to form a polish groove in the length direction; and the rotary polishing machine has a cylindrical shape and includes an outer circumferential surface that defines and functions as the polishing surface.

2. The method of manufacturing an electronic component according to claim 1, wherein the unfired multilayer bodies are bonded to the adhesive sheet to be spaced away from each other in a direction of relative movement between the rotary polishing machine and the adhesive sheet; and a distance between the unfired multilayer bodies adjacent to each other is substantially equal to or greater than a dimension of each of the unfired multilayer bodies in the stacking direction or in the length direction.

3. The method of manufacturing an electronic component according to claim 1, wherein a bank surrounding the unfired multilayer bodies is provided on a surface of the adhesive sheet to which the unfired multilayer bodies are bonded; and the bank has a height substantially equal to or greater than a dimension of each of the unfired multilayer bodies in the width direction.

4. The method of manufacturing an electronic component according to claim 1, wherein a magnet is provided to attract the unfired multilayer bodies peeled off from the adhesive sheet by polishing.

5. The method of manufacturing an electronic component according to claim 1, wherein each of the plurality of internal electrodes includes Ni.

6. The method of manufacturing an electronic component according to claim 5, wherein each of the plurality of internal electrodes further includes Cu, Ag, Pd, an Ag—Pd alloy, and Au.

7. The method of manufacturing an electronic component according to claim 5, wherein each of the plurality of internal electrodes further includes a plurality of dielectric particles.

8. The method of manufacturing an electronic component according to claim 1, wherein each of the plurality of dielectric layers includes a plurality of crystalline particles each including Ba and Ti.

9. The method of manufacturing an electronic component according to claim 1, wherein the plurality of internal electrodes include at least a first internal electrode and a second internal electrode;

the first internal electrode extends to the first end surface of the multilayer body and is exposed at each of the first side surface and the second side surface of the multilayer body; and the second internal electrode extends to the second end surface of the multilayer body and is exposed at each of the first side surface and the second side surface of the multilayer body.

10. The method of manufacturing an electronic component according to claim 1, further comprising a step of forming a first external electrode and a second external electrode.

11. The method of manufacturing an electronic component according to claim 10, wherein the first external electrode covers an entire surface of the first end surface of the multilayer body; and the second external electrode covers an entire surface of the second end surface of the multilayer body.

12. The method of manufacturing an electronic component according to claim 10, wherein the plurality of internal electrodes include at least a first internal electrode and a second internal electrode;

the first external electrode is electrically connected to the first internal electrode; and the second external electrode is electrically connected to the second internal electrode.

13. The method of manufacturing an electronic component according to claim 10, wherein the first external electrode and the second external electrode each include an underlying electrode layer and a plated layer that is provided on the underlying electrode layer.

14. The method of manufacturing an electronic component according to claim 1, wherein an insulating sheet is affixed to at least one of the first and second side surfaces of each of the plurality of unfired multilayer bodies by at least one roller.

15. The method of manufacturing an electronic component according to claim 14, wherein the insulating sheet is formed into the first insulating layer.

* * * * *